United States Patent
Sipos

(10) Patent No.: US 7,128,501 B1
(45) Date of Patent: Oct. 31, 2006

(54) LATHE TOOL ASSEMBLY

(76) Inventor: Sandor Sipos, 5232 Fighting Fish Way, Las Vegas, NV (US) 89118-0619

( * ) Notice: Subject to any disclaimer, the term of this patent is extended or adjusted under 35 U.S.C. 154(b) by 0 days.

(21) Appl. No.: 11/174,194

(22) Filed: Jul. 5, 2005

(51) Int. Cl.
*B26D 1/12* (2006.01)

(52) U.S. Cl. .................. 407/107; 407/108; 407/100

(58) Field of Classification Search ........ 407/107–117, 407/87, 94, 100
See application file for complete search history.

(56) References Cited

U.S. PATENT DOCUMENTS

| | | | |
|---|---|---|---|
| 3,084,416 A | * | 4/1963 | Broughton .................. 407/5 |
| 3,102,326 A | * | 9/1963 | Conti et al. .................. 407/5 |
| 3,303,553 A | * | 2/1967 | Severson .................. 407/6 |
| 3,731,356 A | * | 5/1973 | Gowanlock .................. 407/5 |
| 3,864,799 A | * | 2/1975 | McCreery et al. .......... 407/101 |
| 4,189,264 A | * | 2/1980 | Kraemer .................. 407/2 |

* cited by examiner

*Primary Examiner*—Willmon Fridie, Jr.
(74) *Attorney, Agent, or Firm*—Leonard Weiss

(57) ABSTRACT

A lathe tool assembly includes a pair of set screws that reduce vibration of a work piece that is being machined. A clamp set screw passes through a clamping assembly to a chip breaker that covers a cutting bit. The end of the clamp set screw bears against the chip breaker. A lateral motion inhibitor screw engages threads within a hole within a cutting bit holder and threads within a hole through the cutting bit.

1 Claim, 3 Drawing Sheets

LATHE TOOL ASSEMBLY

BACKGROUND OF THE INVENTION

1. Field of Invention

This invention is in the general field of machine tools and, more particularly, is a tool with a cutting edge secured against a change in position that may be caused by contact with a work piece.

2. Description of the Prior Art

The prior art includes a structure disclosed in applicant's Swedish Pat. No. 32, 257. The apparatus disclosed therein has less adjustment than is desirable and in addition one screw, which extends from the top of the structure, holds the entire structure together. This has the result that when the screw is loosened the entire structure comes apart and an angular positioning of the structure must be reset.

SUMMARY OF THE INVENTION

An object of the present invention is to maintain a desired position of a cutting bit relative to a work piece during a machining operation of the work piece.

According to the present invention, a clamp main screw connects a clamp assembly to a head assembly of the tool. The head assembly includes a cutting bit that fits within a recess of a cutting bit holder. A threaded hole through the cutting bit and s threaded hole in the recess are in axial alignment. Threads of a lateral motion inhibitor screw engage threads in the aligned holes.

The clamp assembly additionally includes a chip breaker insert having a distal surface that covers the shelf with the cutting bit therein.

A clamp set screw is screwed into a hole through the clamp to cause an end of the clamp set screw to bear against a proximal surface of the chip breaker insert.

DESCRIPTION OF THE PREFERRED EMBODIMENT

Figure 1:
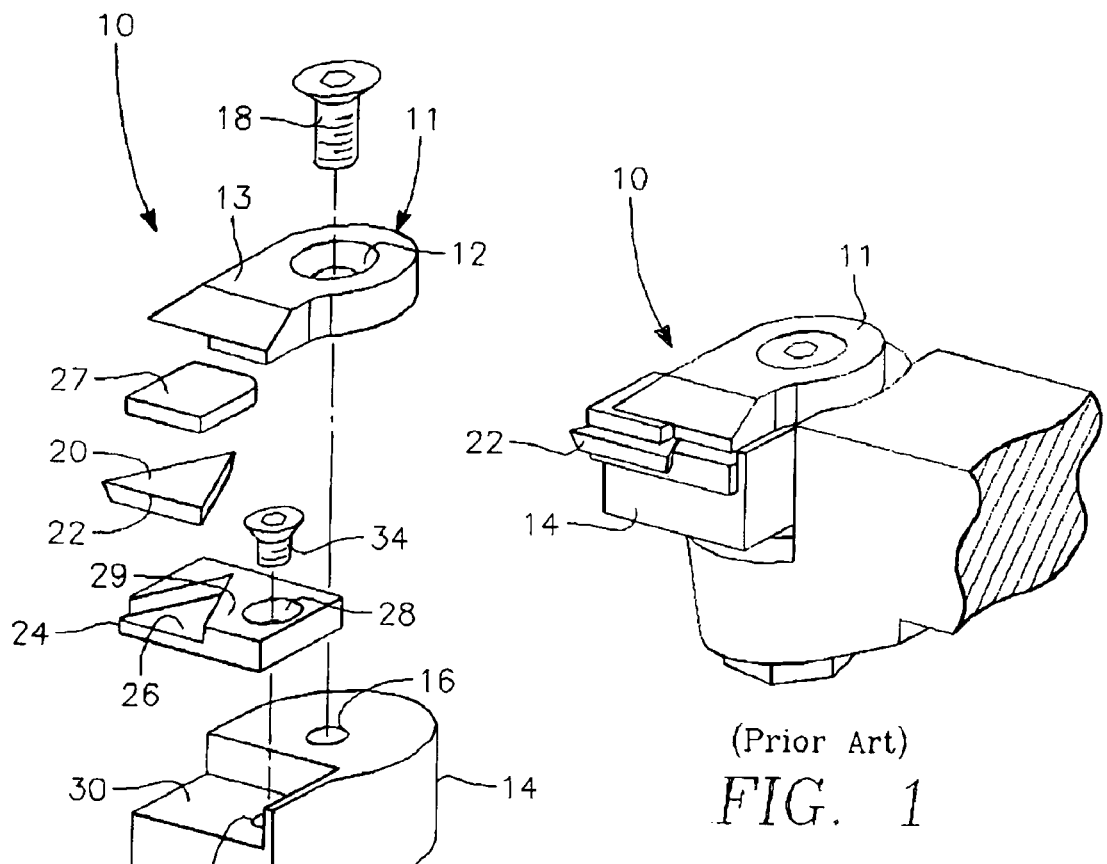
FIG. 1 is a perspective view of a machine tool in accordance with the prior art.
Figure 2:
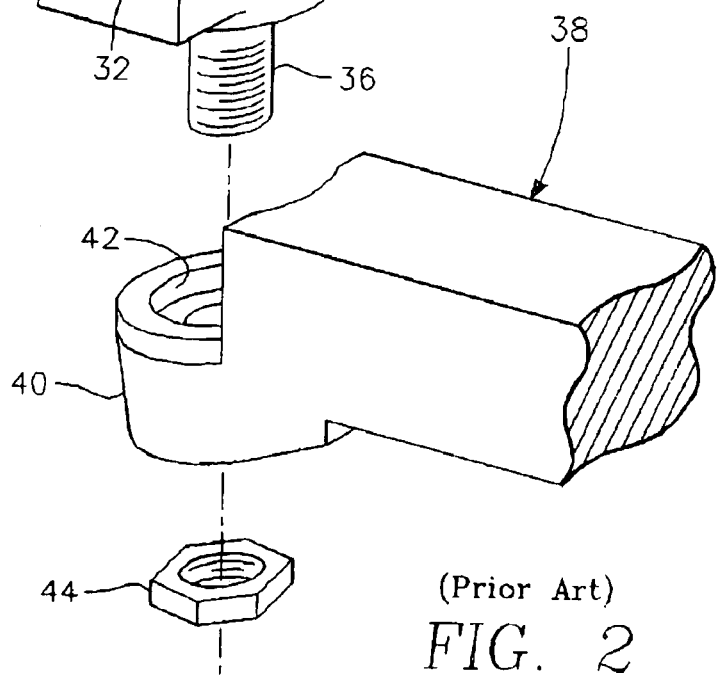
FIG. 2 is an exploded view of the tool of FIG. 1.
Figure 3:
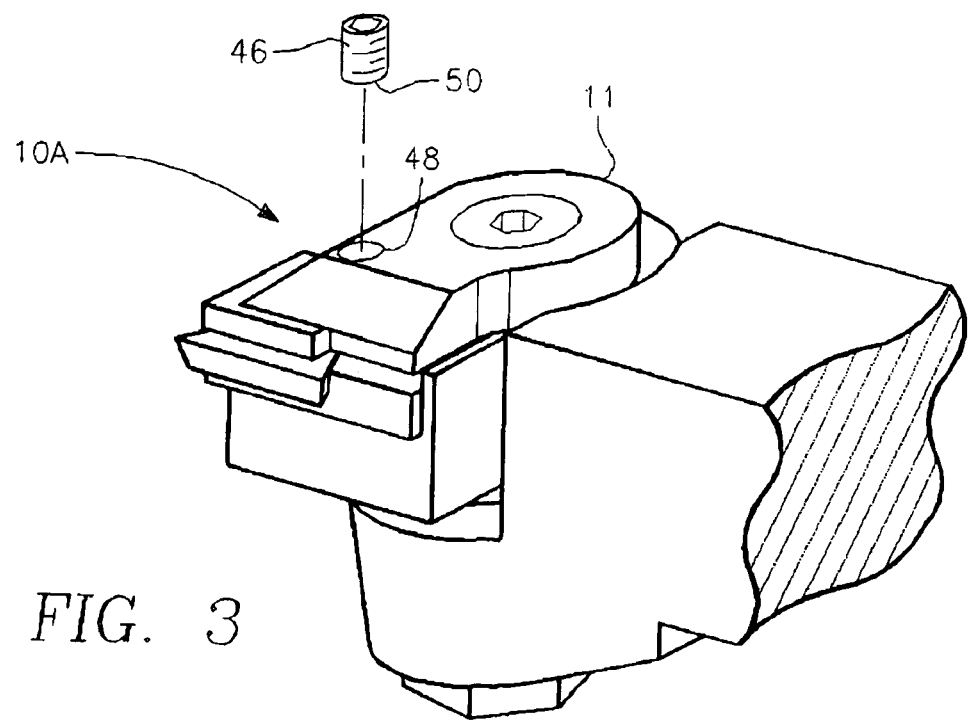
FIG. 3 is a perspective view of a machine tool in accordance with the present invention.
Figure 4:
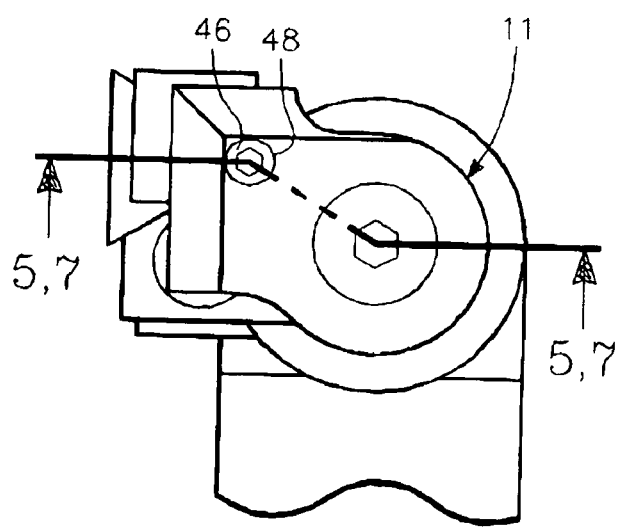
FIG. 4 is a top elevation of the tool of FIG. 3.
Figure 5:
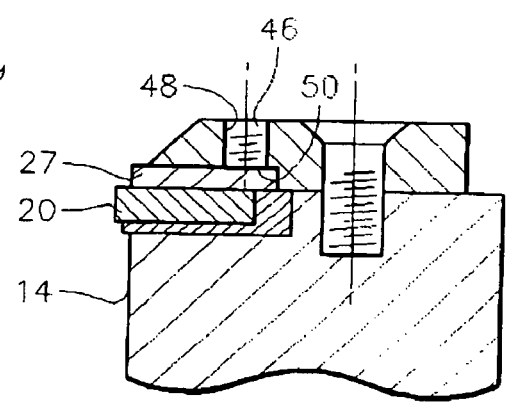
FIG. 5 is a section of FIG. 4 taken along the line 5,7—5,7.

As shown in FIGS. 1 and 2, a machine tool 10 of the prior art includes a clamp assembly 11 having a tapered hole 12 therethrough. The widest part of the hole 12 is at a surface 13 of the clamp assembly 11.

The tool 10 additionally includes a head assembly 14 with a threaded hole 16 therein. The holes 12, 16 are in axial alignment.

A clamp main screw 18 has a tapered head that is complimentary to the hole 12. The screw 18 is within the holes 12,16 with threads of the screw 18 engaging threads within the hole 16. It should be understood that the purpose of the screw 18 is to connect the clamp assembly 11 to the head assembly 14.

The tool 10 includes a cutting bit 20 having top and bottom triangular faces and a cutting edge 22. A cutting bit holder 24 has a triangular recess 26. Although almost all of the cutting bit 20 fits within the recess 26, the edge 22 is outside of the recess 26. It should be understood that the edge 22 cuts a workpiece that is being machined.

What is referred to as a chip breaker 27 is maintained between the clamp assembly 11 and the recess 26 with the cutting bit 20 therein.

The cutting bit holder 24 has a tapered hole 28 therethrough. The widest part of the hole 28 is at a surface 29 of the cutting bit holder 24.

The head 14 has a shelf 30 upon which the cutting bit holder 24 is placed. The shelf 30 has a threaded hole 32 therein. The holes 28, 32 are in axial alignment.

A lateral motion inhibitor screw 34 has a tapered head that is complimentary to the hole 28. The screw 34 is within the holes 28, 32 with threads of the screw 34 engaging threads within the hole 32. It should be understood that the purpose of the screw 34 is to prevent movement of the bit holder 24.

The head assembly 14 has a threaded transition part 36. When the tool 10 is used, it is connected to a lathe through a coupling rod 38 having a coupling ring 40 with a hole 42. The transition part 36 passes through the hole 42 where it is maintained by a nut 44 that screws onto the transition part 36.

As shown in FIGS. 3–7, in a preferred embodiment of the invention, a machine tool 10A has a set screw 46 screwed through a threaded hole 48 of the clamp assembly 11. An end 50 of the screw 46 bears against the chip breaker 27, thereby inhibiting undesired movement of the cutting bit 20.

Figures 6, 7:
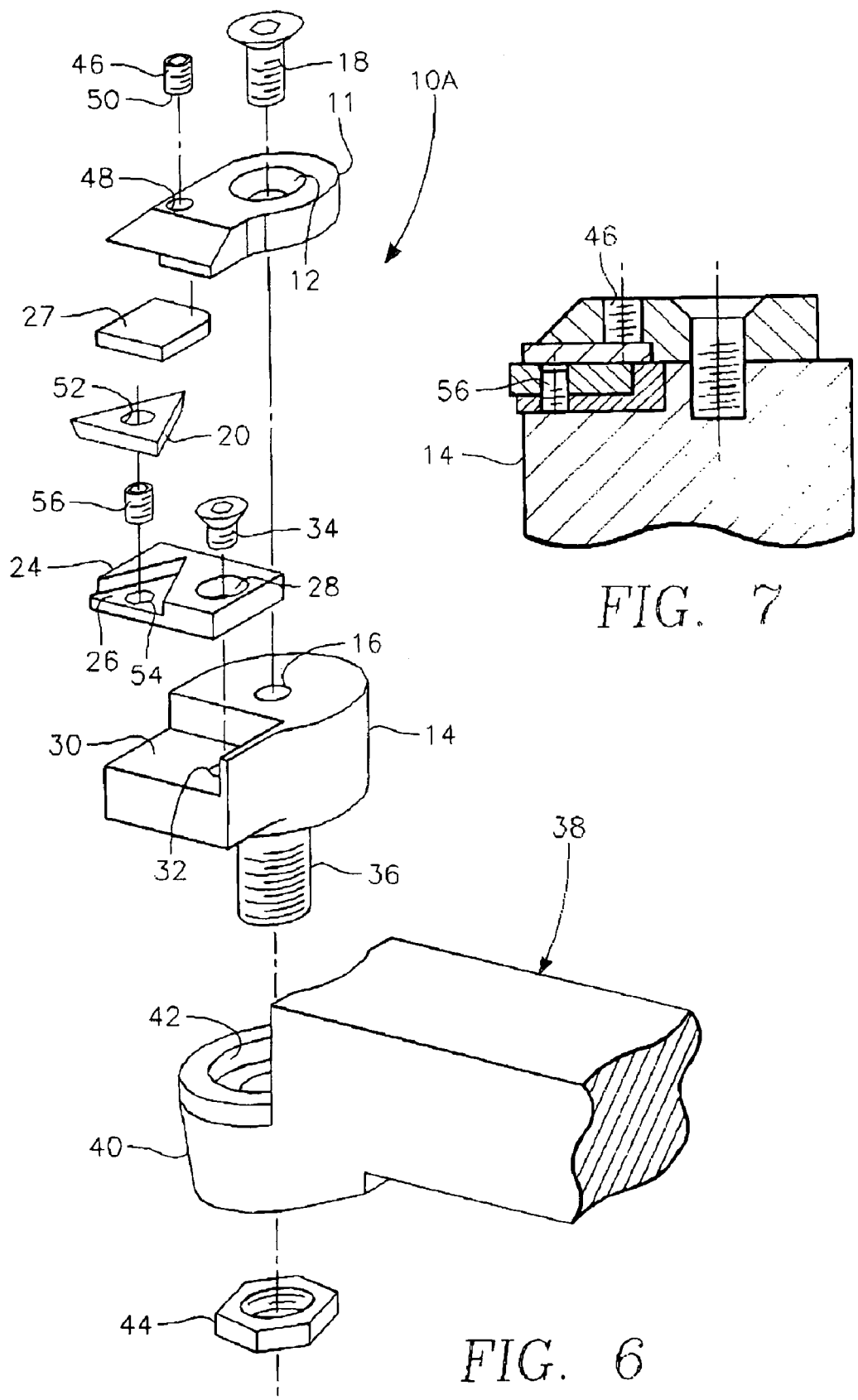
FIG. 6 is an exploded view of FIG. 3.
FIG. 7 is a section of FIG. 4 taken along the line 5,7—5,7 to show a lateral motion inhibitor set screw.

The cutting bit 20 has a threaded hole 52 therethrough. The cutting bit holder 24 has a threaded hole 54 through the recess 26. The holes 52, 54 are in axial alignment (FIG. 6). A head assembly set screw 56 is screwed into the holes 52, 54 (FIG. 7) to prevent movement of the cutting bit 20 within the recess 26.

I claim:

1. In a machine tool having a clamp assembly connected to a head assembly with a shelf whereon a screw connects the shelf to a cutting bit holder, said bit holder having a recess with a substantial portion of the cutting bit therein and a cutting edge of said cutting bit extending therefrom and a chip breaker disposed between said clamp assembly and said cutting bit holder, the improvement comprising:

a clamp assembly set screw that screws into said clamp assembly to cause the end of said clamp set screw to bear against said chip breaker; and means for preventing movement of the cutting bit within the recess.

* * * * *